United States Patent
Coffin et al.

(10) Patent No.: US 7,334,978 B2
(45) Date of Patent: Feb. 26, 2008

(54) CARTRIDGE-HANDLING APPARATUS FOR A MEDIA STORAGE SYSTEM

(75) Inventors: Paul C. Coffin, Battleground, WA (US); Robert L. Mueller, San Diego, CA (US); Gregg S. Schmidtke, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 263 days.

(21) Appl. No.: 10/601,437

(22) Filed: Jun. 23, 2003

(65) Prior Publication Data
US 2004/0258507 A1 Dec. 23, 2004

(51) Int. Cl.
B65G 1/137 (2006.01)

(52) U.S. Cl. .................... 414/273; 360/98.05

(58) Field of Classification Search ........... 414/273, 414/275, 226.01, 280; 360/98.05, 93, 98.07; 901/16
See application file for complete search history.

(56) References Cited

U.S. PATENT DOCUMENTS

| | | | | |
|---|---|---|---|---|
| 4,812,629 A * | 3/1989 | O'Neil et al. | ............... | 235/383 |
| 4,891,720 A * | 1/1990 | Grant et al. | ................. | 360/92 |
| 4,945,430 A | 7/1990 | Konishi et al. | | |
| 4,973,819 A * | 11/1990 | Thatcher | ................ | 219/121.78 |
| 4,989,191 A | 1/1991 | Kuo et al. | | |
| 5,059,772 A | 10/1991 | Younglove et al. | | |
| 5,064,337 A * | 11/1991 | Asakawa et al. | ........... | 414/639 |
| 5,128,912 A * | 7/1992 | Hug et al. | ................ | 369/30.61 |
| 5,419,410 A * | 5/1995 | Yanagisawa | ................. | 186/49 |
| 5,515,356 A * | 5/1996 | Lee | ........................ | 369/30.45 |
| 5,544,146 A | 8/1996 | Luffel et al. | | |
| 5,596,556 A | 1/1997 | Luffel et al. | | |
| 5,726,866 A * | 3/1998 | Allen | ........................ | 361/816 |
| 5,898,593 A | 4/1999 | Baca et al. | | |
| 5,940,361 A | 8/1999 | Proctor | | |
| 5,996,741 A | 12/1999 | Jones et al. | | |
| 6,041,988 A * | 3/2000 | Shapiro | ........................ | 225/1 |
| 6,068,436 A | 5/2000 | Black et al. | | |
| 6,222,699 B1 | 4/2001 | Luffel et al. | | |
| 6,262,863 B1 * | 7/2001 | Ostwald et al. | ............... | 360/92 |
| 6,264,419 B1 * | 7/2001 | Schinzel | ................... | 414/751.1 |
| 6,309,162 B1 * | 10/2001 | White | ........................ | 414/273 |
| 6,327,113 B1 | 12/2001 | Mueller et al. | | |
| 6,407,933 B1 * | 6/2002 | Bolognia et al. | ........... | 361/826 |
| 6,754,768 B2 * | 6/2004 | Dimitri et al. | .............. | 711/114 |
| 2004/0133902 A1 * | 7/2004 | Luffel et al. | ................ | 720/632 |
| 2006/0193078 A1 * | 8/2006 | Hext et al. | .................... | 360/92 |

FOREIGN PATENT DOCUMENTS

EP   0982723 A   3/2000

(Continued)

OTHER PUBLICATIONS

European Search Report, Sep. 27, 2006.

*Primary Examiner*—Charles A. Fox

(57) ABSTRACT

Cartridge-handling apparatus for a media storage system comprising a lift assembly having at least one guide track aligned along a first displacement path in the media storage system. A carriage having a transfer shaft aligned along a second displacement path in the media storage system. The transfer shaft operatively associated with the at least one guide track of the lift assembly for moving the carriage along the at least one guide track through the first displacement path. A picker slidably mounted on the carriage to the transfer shaft. The picker moving with the carriage through the first displacement path, and the picker moving on the transfer shaft through the second displacement path.

29 Claims, 7 Drawing Sheets

FOREIGN PATENT DOCUMENTS

| | | |
|---|---|---|
| FR | 2366661 | 4/1978 |
| JP | 3139366 | 6/1991 |
| JP | A-H06-314460 | 11/1994 |
| JP | A-H09-167412 | 6/1997 |
| JP | A-H09-198755 | 7/1997 |
| JP | A-H10-064144 | 3/1998 |

* cited by examiner

CARTRIDGE-HANDLING APPARATUS FOR A MEDIA STORAGE SYSTEM

FIELD OF THE INVENTION

The invention generally pertains to media storage systems, and more specifically, to cartridge-handling apparatus for media storage systems.

BACKGROUND

Media storage systems are well-known in the art and are commonly used to store data cartridges at known locations and to retrieve desired data cartridges as needed so that data may be written to and/or read from the data cartridges. Such media storage systems are also often referred to as autochangers or library storage systems.

The data cartridges are typically stored in individual storage locations at various levels throughout the media storage system. A cartridge-engaging assembly or "picker" may be provided for engaging and transporting the various data cartridges stored therein. For example, the picker may access a data cartridge from a "mail slot" and transport the data cartridge to another storage location in the media storage system. As another example, the picker may transport a data cartridge from a storage location to a read/write device for read and/or write operations.

Various systems for transporting data cartridges in the media storage system are available. However, these systems are often complex, having many different components for effecting movement of the picker in the media storage system. High part-count increases assembly time, maintenance, and ultimately the cost of the media storage system.

SUMMARY OF THE INVENTION

Cartridge-handling apparatus for a media storage system may comprise a lift assembly having at least one guide track aligned along a first displacement path in the media storage system, and a carriage having a transfer shaft aligned along a second displacement path in the media storage system. The transfer shaft is operatively associated with the at least one guide track of the lift assembly for moving the carriage along the at least one guide track through the first displacement path. A picker is slidably mounted on the carriage to the transfer shaft, the picker moving with the carriage through the first displacement path, the picker moving on the transfer shaft through the second displacement path.

BRIEF DESCRIPTION OF THE DRAWINGS

Illustrative and presently preferred embodiments of the invention are shown in the drawings, in which.

DETAILED DESCRIPTION

Figure 1:
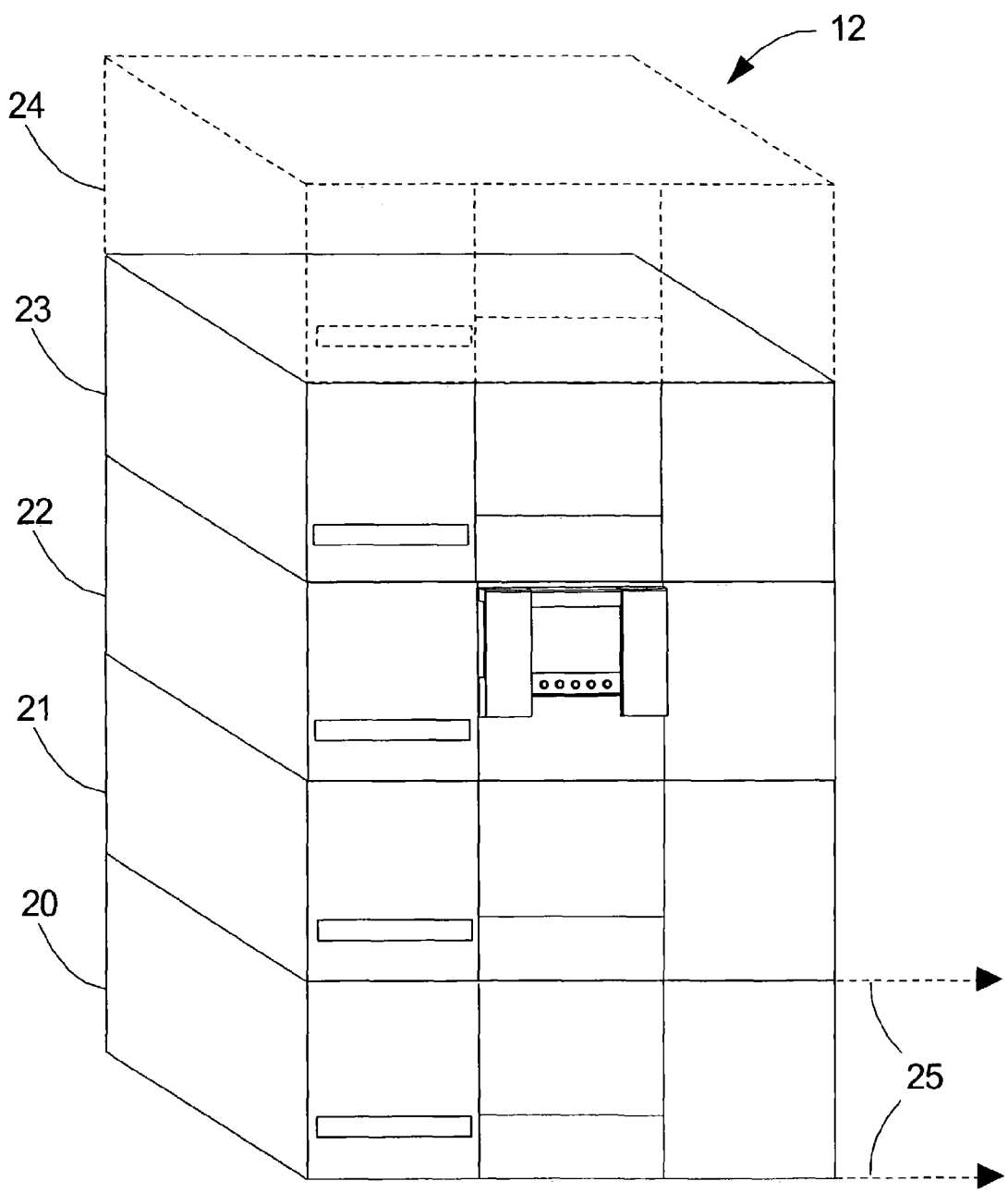
FIG. 1 is a perspective view of a media storage system as it may be used according to one embodiment of the invention to store and access data cartridges.

Cartridge-handling apparatus 10 (FIG. 2) for a media storage system 12 is shown and described herein according to embodiments of the invention. Briefly, media storage systems 12, such as the one shown in FIG. 1 and FIG. 2, may comprise one or more storage libraries 20–23 (referred to hereinafter generally by reference number 20 unless identifying a specific storage library). Data cartridges 14 may be stored in individual storage locations 16 in the storage libraries 20 (FIG. 2). Cartridge-handling apparatus 10 may be used to transport the data cartridges 14 in the media storage system 12. For example, the data cartridges 14 may be delivered to a read/write device 18 for read and/or write operations and returned to the storage location 16 following the read/write operation.

Figure 2:
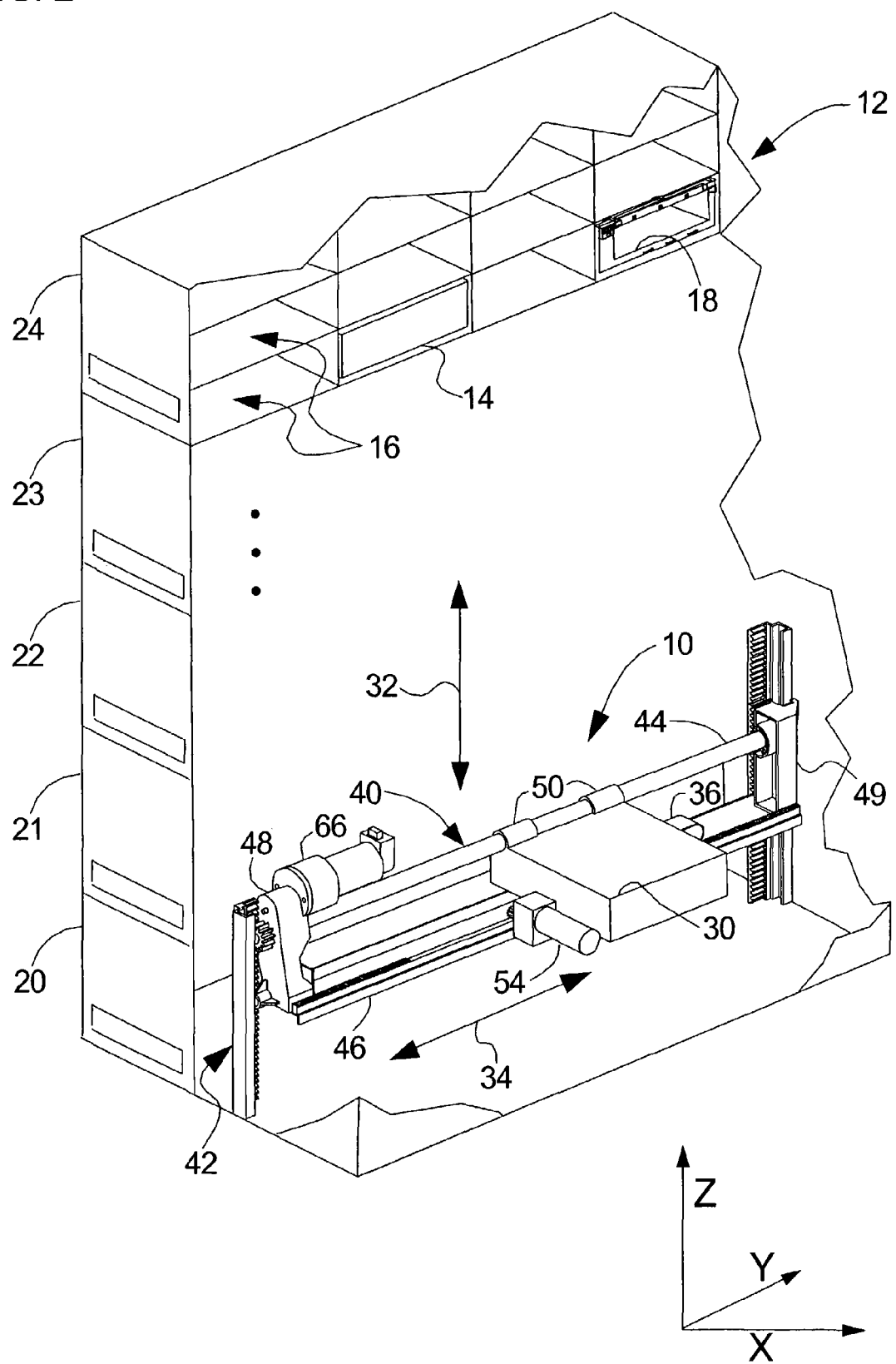
FIG. 2 is a perspective view of one embodiment of a cartridge-handling apparatus shown mounted in the media storage system of FIG. 1.

More specifically, and with reference to the embodiment shown in FIG. 1 and FIG. 2, a modular media storage system 12 may comprise a number of individual storage libraries 20 that are arranged adjacent one another. Additional storage libraries 20 may be added to the media storage system 12 to provide storage capacity for more data cartridges 14. Alternatively, where fewer storage libraries 20 are needed, storage libraries 20 may be removed.

Storage libraries 20 are commonly stacked one on top of the other, as shown in FIG. 1. Of course more storage libraries may also be stacked on the media storage system 12, as illustrated by storage library 24. Other arrangements are also possible. For example, storage libraries 20 may be stacked next to one another (on either side, in front, or behind), as illustrated by lines 25 in FIG. 1.

Generally, each storage library 20 comprises a number of storage locations 16 sized to retain the data cartridges 14 therein, as shown according to one embodiment in FIG. 2. For example, the data cartridges 14 may be stored horizontally in individual storage slots 16. Removable storage magazines (not shown) may also be provided for the convenience of the user, for example, to readily add or remove several data cartridges 14 at a time. In some embodiments, the user may manually access the storage slots 16 through drawers provided in the storage libraries 20 which are configured to slide outward from the media storage system 12.

The media storage system 12 may also be provided with one or more read/write devices 18. The read/write device(s) 18 may be arranged in any suitable position in one or more of the storage libraries 20. For example, a read/write device 18 is shown in FIG. 2 positioned among the storage locations 16 in one of the storage libraries (storage library 24). Read/write device 18 may be used to perform read and/or write operations on the data cartridges 14, allowing the user to access the data stored thereon.

It is noted that although the data cartridges 14 are shown arranged in a particular configuration in FIG. 2, other suitable configurations are also contemplated as being within the scope of the invention. In addition, the number of storage locations 16 and read/write devices 18 provided in the media storage system 12 may depend upon various design considerations. Such considerations may include, but are not limited to, the frequency with which data is accessed, and the desired physical dimensions of the storage libraries 20 and media storage system 12.

It should be noted that media storage system 12 may also be provided with various ancillary devices, such as power supplies, electronic controls, input/output (I/O) devices, and data processing systems, to name only a few. Such ancillary devices are commonly associated with media storage systems 12, and therefore are not shown or described herein.

The foregoing description of one embodiment of media storage system 12 is provided in order to better understand one environment in which cartridge-handling apparatus 10 of the present invention may be used. It should be understood that cartridge-handling apparatus 10 may also be used in conjunction with any of a wide range of other types and configurations of media storage systems, now known or that may be developed in the future.

One embodiment of cartridge-handling apparatus 10 is shown and described with reference to FIG. 2 through FIG. 4 as it may be used with media storage system 12. Cartridge-handling apparatus 10 may comprise a cartridge-engaging assembly or "picker" 30. Briefly, the cartridge-handling apparatus 10 may be operated to effect travel of the picker 30 in media storage system 12 through a first displacement path (illustrated by arrows 32 in FIG. 2) and a second displacement path (illustrated by arrows 34 in FIG. 2).

Before continuing, it should be noted that reference is made herein to the X-axis, Y-axis, and Z-axis. The first displacement path generally corresponds with the Z-axis, and the second displacement path generally corresponds with the Y-axis. However, it is understood that these orientations are used only for purposes of illustration. The invention is not limited to any particular orientation.

Cartridge-handling apparatus 10 may comprise any suitable picker 30. Preferably, picker 30 is configured such that it can engage a data cartridge 14, withdraw the data cartridge 14 (e.g., from a storage location 16 or read/write device 18), retain the data cartridge 14 for transportation in the media storage system 12, and eject the data cartridge 14 at an intended destination.

Figure 3:
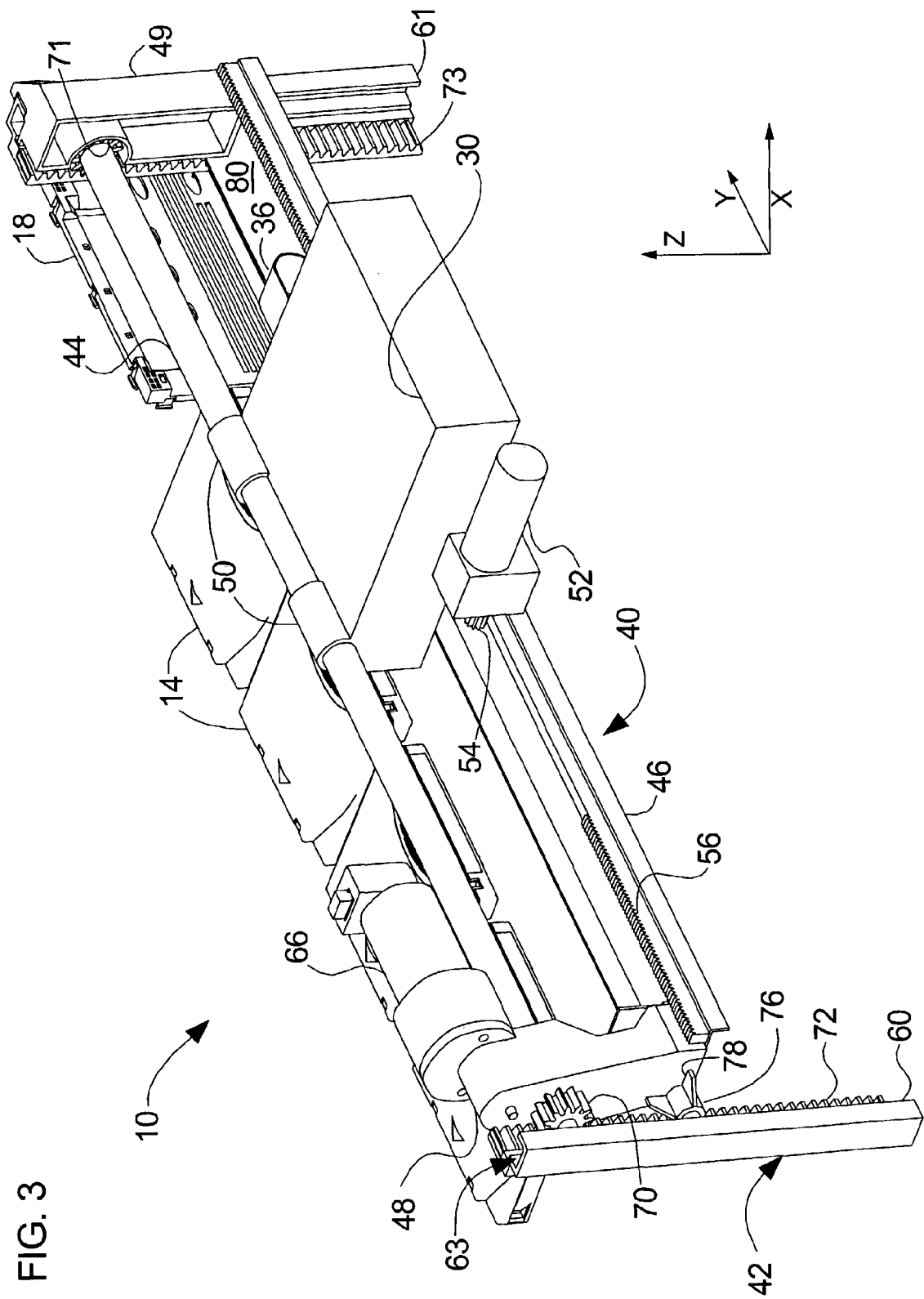
FIG. 3 is a detailed perspective view of the embodiment of the cartridge-handling apparatus shown in FIG. 2.
Figure 4:
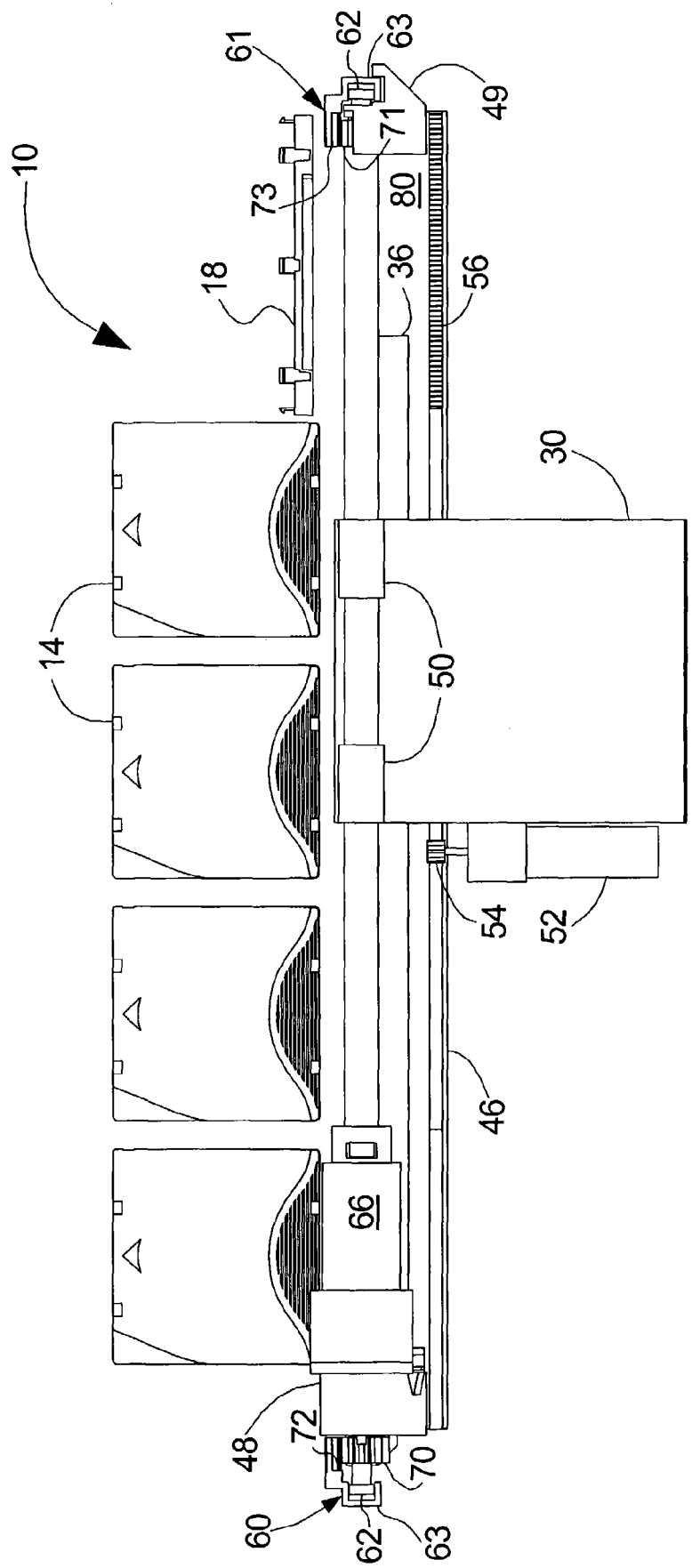
FIG. 4 is a plan view of the embodiment of the cartridge-handling apparatus shown in FIG. 3.

Cartridge-handling apparatus 10 is shown in more detail in FIG. 3 with the picker 30 positioned adjacent data cartridges 14. The faceplate of read/write device 18 is also shown for purposes of illustration. Picker 30 may be positioned adjacent a data cartridge 14 stored in one of the storage locations 16 in the media storage system 12. Picker 30 may then be operated to withdraw one of the data cartridges 14 from storage location 16. After retrieving the data cartridge 14, picker 30 may be repositioned in the media storage system 12 at the intended destination, such as adjacent read/write device 18. Picker 30 may then be operated to eject data cartridge 14 into the read/write device 18 for a read and/or write operation. Following the read/write operation, cartridge-handling apparatus 10 may be used to return the data cartridge 14 to one of the storage locations 16 in media storage system 12.

It is understood, of course, that the invention is not limited to use with any particular type or style of picker 30. A suitable picker for use with the present invention may be readily provided by one skilled in the art after having become familiar with the teachings of the present invention. Pickers and the operation thereof is well-understood by those skilled in the art, and further description is not required for a complete understanding of the invention.

Cartridge-handling apparatus 10 preferably comprises a carriage 40 operatively associated with a lift assembly 42, as more readily seen in FIG. 3. Picker 30 may be mounted to the carriage 40. The carriage 40 and lift assembly 42 are provided to effect travel of the picker 30 through the first and second displacement paths in media storage system 12, as will be explained in more detail below.

One embodiment of the carriage 40 comprises a transfer shaft 44 and a transfer platform 46. Transfer platform 46 is substantially aligned with the transfer shaft 44 through the second displacement path. End caps 48, 49 may be provided to mount the transfer platform 46 to the transfer shaft 44 in spaced-apart relation to one another. Picker 30 is mounted to the carriage 40 on transfer shaft 44.

Preferably, picker 30 is mounted to the transfer shaft 44 in such a manner that the transfer shaft 44 may rotate about the Y-axis without causing the picker 30 to rotate therewith. In one embodiment, one or more mounting brackets 50 may be used to mount the picker 30 to the transfer shaft 44. Mounting brackets 50 may comprise generally cylindrical bands which are at least partially wrapped around the transfer shaft 44, allowing picker 30 to slide along the transfer shaft 44.

Other embodiments for mounting the picker 30 to the transfer shaft 44 are also contemplated as being within the scope of the invention. For example, picker 30 may be mounted to transfer shaft 44 using a pin-in-slot mounting system, rollers, etc. Preferably, the picker 30 is mounted to the transfer shaft 44 in a manner which provides stability and allows for accurate positioning of the picker 30 in media storage system 12. In addition, picker 30 should readily slide along the transfer shaft 44 (e.g., low-friction engagement).

Carriage 40 also preferably comprises a drive motor 52 for effecting movement of the picker 30 along the Y-axis. The drive motor 52 may be mounted to picker 30, and may be operatively associated with the transfer platform 46. According to one embodiment, drive motor 52 is operatively associated with a drive pinion 54, which engages a gear rack 56 extending along transfer platform 46. The drive motor 52 may be operated to rotate the drive pinion 54, which in turn causes the picker 30 to move along the gear rack 56 through the second displacement path.

It is noted that in one embodiment, gear rack 56 may be fashioned as part of the transfer platform 46 (e.g., stamped or cut in sheet metal). Such an embodiment reduces part count and the associated costs of having to provide separate components. Of course, other embodiments are also contemplated as being within the scope of the invention. For example, gear rack 56 may be a separate component which is mounted to the guide platform 46.

Other embodiments for effecting movement of the picker 30 along the Y-axis are also contemplated as being within the scope of the invention. For example, the drive motor 52 may operate a roller which frictionally engages the transfer platform 46. As another example, the drive motor 52 may operate a belt and pulley system.

The carriage 40 may be movably mounted in media storage system 12 to the lift assembly 42. According to one embodiment, lift assembly 42 comprises first and second guide tracks 60, 61 aligned along the first displacement path in media storage system 12. The guide tracks 60, 61 are positioned in spaced-apart relation to one another and may be mounted to opposing walls of the storage libraries 20, as shown in FIG. 2. Carriage 40 extends between and is mounted to the guide tracks 60, 61, as will be described below.

Preferably, the guide tracks 60, 61 are sized to fit within an individual storage library 20. Additional guide tracks 60, 61 can be provided with each storage library 20 and interconnect to form a continuous track through each of the storage libraries 20 in media storage system 12. However, any length guide tracks 60, 61 may be provided for use with the present invention.

It is also noted that any suitable fastening means may be used to mount the guide tracks 60, 61 in media storage system 12. Exemplary fastening means include, but are not limited to, screws, clips, mounting brackets, adhesive, or a combination thereof. In addition, the guide tracks 60, 61 may be mounted in any suitable manner and need not necessarily be mounted to the walls of the storage libraries 20. In another embodiment, for example, guide tracks 60, 61 may be mounted to the floor of the lower-most storage library 20 and/or suspended from the top of the upper-most storage library 24.

Figure 5:
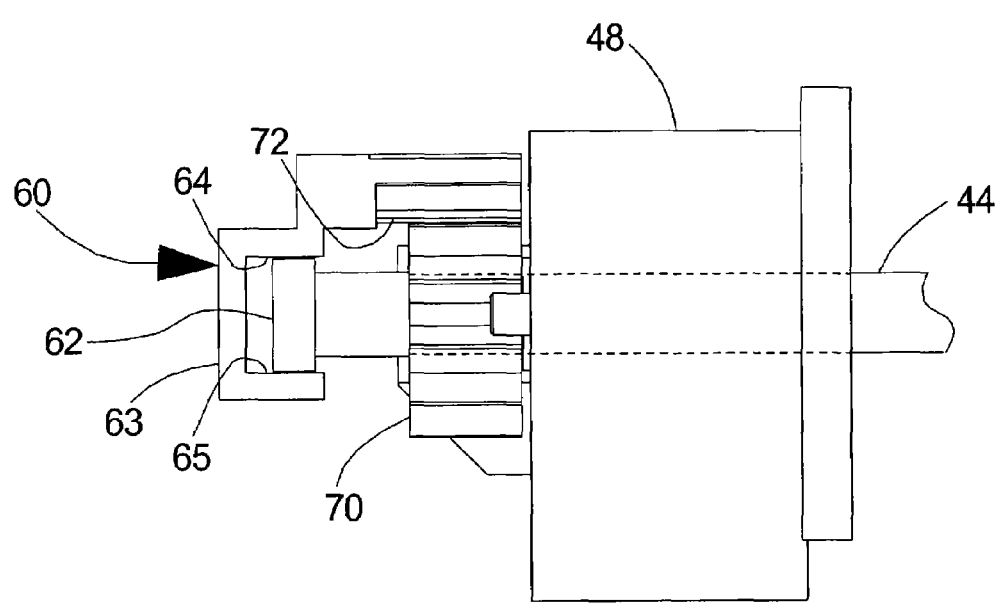
FIG. 5 is a plan view of the cartridge-handling apparatus of FIG. 4 showing the engagement of the carriage to the lift assembly in more detail according to one embodiment of the invention.

Preferably, carriage 40 is mounted to the guide tracks 60, 61 so that the carriage 40 can be moved relative to the guide tracks 60, 61 through the first displacement path in media storage system 12. In one embodiment shown in more detail in FIG. 4 and FIG. 5, carriage 40 is provided with bearing members 62 on each end which slidably engage bearing race 63 provided on each guide track 60, 61. For example, the bearing members 62 may be mounted to the transfer shaft 44 and may slide between opposed bearing surfaces 64, 65 of bearing race 63 (FIG. 5).

Bearing members 62 and bearing race 63 may be fabricated from any suitable material. In one exemplary embodiment, the bearing members 62 are made of a hard plastic material, while the bearing race 63 is made of sheet metal. Other materials may also be used according to the teachings of the invention. Preferably, the engagement between the bearing members 62 and bearing race 63 is one of low-friction, so as to readily slide relative to one another. Low-friction engagement may be enhanced, for example, by coating bearing members 62 and/or bearing race 63 with a low-friction material (e.g., TEFLON®) and/or lubricant.

Again with reference to FIG. 2 through FIG. 4, carriage 40 may be moved relative to the lift assembly 42 by means of another drive motor 66, which may be mounted to the carriage 40 (e.g., on one of the end caps 48). Drive motor 66 is operatively associated with one or more drive pinions 70, 71. The drive pinions 70, 71 engage gear racks 72, 73 provided on the guide tracks 60, 61. Drive motor 66 may be operated to rotate the drive pinions 70, 71, causing the carriage 40, and hence the picker 30, to move through the first displacement path in media storage system 12.

Preferably, the drive pinions 70, 71 are mounted to the transfer shaft 44 and rotate therewith. Accordingly, a separate transfer assembly need not be provided to transfer power from the drive motor 66 to both sides of the carriage 40. Instead, the drive motor 66 may be operated to rotate the transfer shaft 44, which in turn causes the drive pinions 70, 71 on both ends of the carriage 40 to rotate. For example, drive motor 66 may be operatively associated with the transfer shaft via a gear assembly, belt driven, direct drive, etc.

It is noted that gear racks 72, 73 may be fashioned as part of the respective guide tracks 60, 61 (e.g., stamped or cut in sheet metal). Such an embodiment reduces part count and the associated costs of having to provide separate components. Of course, other embodiments are also contemplated as being within the scope of the invention. For example, gear racks 72, 73 may be separate components mounted to the respective guide tracks 60, 61.

It is also noted that providing drive pinions 70, 71 on each end of the transfer shaft 44 reduces the occurrence of slipping and binding when the carriage 40 is moved. However, the scope of the invention is not limited to such an embodiment.

Yet other embodiments for moving the carriage 40 relative to the lift assembly 42 are also contemplated as being within the scope of the invention. For example, the carriage 40 may be provided with rollers which frictionally engage the guide tracks 60, 61 on the lift assembly 42. Soft (e.g., rubber) padding may be used to enhance the frictional engagement therebetween. Yet other embodiments can be readily adapted for use with the present invention by one skilled in the art after having become familiar with the teachings of the invention.

Cartridge-handling apparatus 10 may also comprise one or more guide wheels 76 (FIG. 3) mounted to the carriage 40 which serve to stabilize picker 30 and keep it from rotating about the Y-axis (e.g., when the transfer shaft 44 is rotated). Preferably only one guide wheel 76 is provided, so as not to overly-constrain movement of the carriage 40. However, other embodiments are also contemplated as being within the scope of the invention.

In one embodiment, guide wheel 76 is pivotally mounted to carriage 40 (e.g., to end cap 48), and is movable independent of the drive motor 66. Guide wheel 76 preferably extends into the bearing race 63 (e.g., between the opposed bearing surfaces 64, 65). Fins 78 may be provided for structural support.

Operation of the cartridge-handling apparatus 10 (e.g., drive motors 52, 66, picker 30) may require the use of electrical power and control signals. In one embodiment, electrical power and/or control signals is provided via one or more ribbon or "umbilical" cables 36. For example, the umbilical cable 36 may be linked to one or more power/signal sources in the media storage system 12 and connected to the carriage 40 so that it folds and unfolds as the carriage 40 is moved along the Z-axis. The umbilical cable 36 may also extend along the carriage 40 and be connected to the picker 30 as shown in FIG. 2. Umbilical cables, such as these, are well-known in the art and therefore are not described in further detail herein.

Carriage 40 may optionally be provided with an umbilical tray 80. Umbilical tray 80 serves to "collect" the umbilical cable 36 as the picker 30 moves in media storage system 12. Preferably the umbilical cable 36 lays flat on the umbilical tray 80 as the picker 30 is moved in one direction, and rises from the umbilical tray 80 to allow movement of the picker 30 in the opposite direction. Accordingly, the umbilical cable 36 is less likely to become entangled with the cartridge-handling apparatus 10 or other components of the media storage system 12 during operation.

Of course electrical power and/or control signals may be provided in any suitable manner. For example, brush tracks may be provided for making electrical connections between moving parts, remote signals (e.g., radio frequency (RF), infrared (IR)) may be transmitted to the cartridge-handling apparatus 10, and so forth.

The cartridge-handling apparatus 10 may be operated to access and transport data cartridges 14 in the media storage system 12 according to one embodiment of the invention as follows. Briefly, when a user makes a request to access a particular data cartridge 14, a signal is delivered to the control system (not shown). The control system signals the cartridge-handling apparatus 10 to position the picker 30 in the media storage system 12 adjacent the data cartridge 14 to be retrieved. After the picker retrieves the data cartridge 14, the control system signals the cartridge-handling apparatus 10 to reposition the picker 30 in the media storage system 12 so that it is adjacent the intended destination. The data cartridge 14 is then ejected from the picker 30, for example, into read/write device 18. Following the read/write operation, the cartridge-handling apparatus 10 may be used to return the data cartridge 14 to one of the storage locations 16.

When the picker 30 is to be moved to another location in the media storage system 12, the control system delivers a signal to the cartridge-handling apparatus 10 to activate drive motor 52 and/or drive motor 66, as necessary, to position the picker 30 at the desired location along the Z-axis. For example, drive motor 66 may be actuated to move the carriage 40, and hence picker 30, through the first displacement path in the media storage system 12 to retrieve the desired data cartridge 14 from an upper or lower storage library 20. In addition, drive motor 52 may be actuated to move the picker 30 through the second displacement path so that the picker 30 is adjacent one of the storage locations 16 or the read/write device 18 along the Y-axis.

More specifically, drive motor 66 may be operated to rotate transfer shaft 44, and hence drive pinions 70, 71 operatively associated therewith. The cooperative action of the rotating drive pinions 70, 71 in the gear racks 72, 73 on guide tracks 60, 61 causes the carriage 40, and hence picker 30, to move through the first displacement path in media storage system 12. Depending on the direction of rotation of drive motor 66 (e.g., clockwise or counter-clockwise), the picker 30 is either raised or lowered in the media storage system 12. Once the picker 30 is positioned along the Z-axis, drive motor 66 may be shut off or otherwise disengaged.

Drive motor 52 may be operated to rotate drive pinion 54 operatively associated therewith. The cooperative action of the rotating drive pinion 54 in the gear rack 56 on the transfer platform 46 causes the picker 30 to move through the second displacement path in media storage system 12. Depending on the rotation of the drive motor 52 (e.g., clockwise or counter-clockwise), the picker 30 is moved in one direction or the other along the second displacement path. Once the picker 30 is positioned along the Y-axis, drive motor 52 may be shut off or otherwise disengaged.

Once the picker 30 has been positioned in the media storage system 12, the picker 30 may be operated to retract or eject the data cartridge 14. Cartridge-handling apparatus 10 may then be used to position the picker 30 elsewhere in the media storage system 12.

It should be understood that the operation of the cartridge-handling apparatus 10 is not limited to any particular order. For example, picker 30 may be moved through both the first and second displacement paths in the media storage system 12 simultaneously. Likewise, picker 30 may be moved independently through each displacement path. Alternatively, picker 30 may only need to be moved through one of the displacement paths in media storage system 12, for example, where the picker 30 is already properly positioned along the other displacement path.

Figure 6:
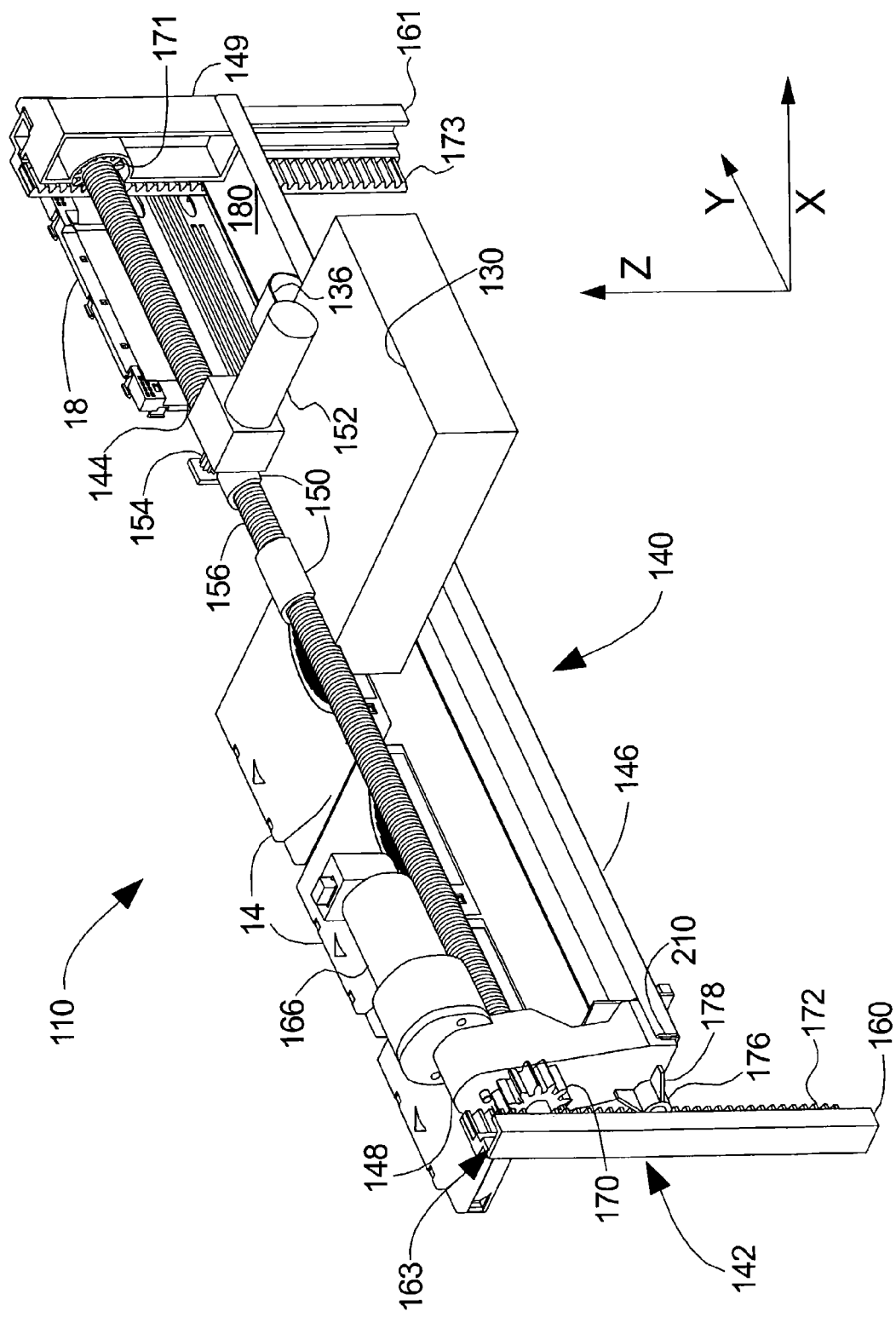
FIG. 6 is a detailed perspective view of another embodiment of a cartridge-handling apparatus.
Figure 7:
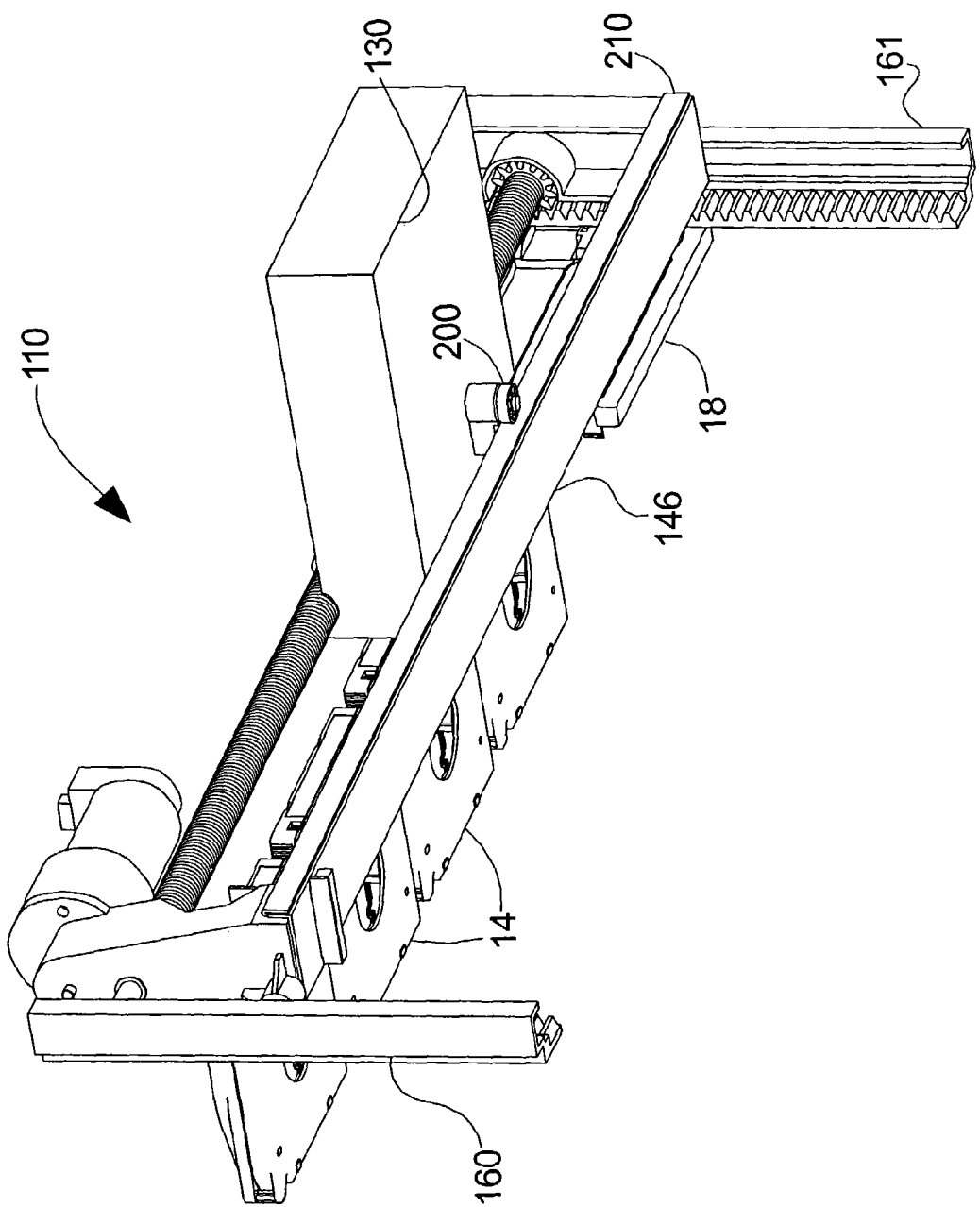
FIG. 7 is a bottom perspective view of the embodiment of the cartridge-handling apparatus shown in FIG. 6.

Cartridge-handling apparatus 110 is shown in FIG. 6 and FIG. 7 according to another embodiment of the invention. It is noted that one-hundred series reference numbers are used to refer to like elements.

According to this embodiment, transfer shaft 144 comprises a plurality of rings 156 (e.g., a tooth profile) formed thereon. For example, the rings 156 may be rolled or otherwise provided around the outer circumference of the transfer shaft 144. Drive motor 152 is mounted to the picker 130 and is operatively associated with a drive pinion 154. Drive pinion 154 engages rings 156 provided around the transfer shaft 144. Such an embodiment eliminates the need for a separate gear rack to effect movement of the picker 130 through the second displacement path.

Preferably rings 156 are formed on transfer shaft 144 with a "zero" pitch. The rings 156 are independent of one another, and do not lead into one another like a screw thread. When transfer shaft 144 is rotated to effect movement of the carriage 140 through the first displacement path, the teeth on drive pinion 154 "ride" between parallel rings 156, without changing the position of the picker 130 along the Y-axis. The picker 130 may be moved along the Y-axis by operating the drive motor 152 to effect movement of the drive pinion 154 relative to the rings 156 on transfer shaft 144.

Also according to preferred embodiments of the invention, rings 156 are preferably evenly spaced from one another along the length of the transfer shaft 144, to facilitate engagement by drive pinion 154. Other embodiments are also contemplated as being within the scope of the invention. For example, the drive motor 152 can be operated to correct for displacement of the picker 130 along the Y-axis where the rings 156 are not zero-pitch or where loose tolerances cause movement of the picker 130 during rotation of the transfer shaft 144.

Also according to this embodiment of cartridge-handling apparatus 110, transfer platform 146 may be provided to support the picker 130. Guide bearing 200 may be provided on picker 130, as can be seen by viewing the picker 130 from underneath (FIG. 7). Guide bearing 200 is preferably pivotally mounted to the picker 130 and engages transfer platform 146. A suitable lining 210 may be provided along the engagement surface on the transfer platform 146 to reduce friction between the guide bearing 200 and the transfer platform 146. Of course the invention is not limited to such an embodiment, and other suitable engagement means are also contemplated as being within the scope of the invention.

Cartridge-handling apparatus 110 may be operated similarly to that described above with respect to operation of embodiment 10. Again, drive motor 166 may be operated to rotate transfer shaft 144, and hence drive pinions 170, 171 operatively associated therewith. The cooperative action of the rotating drive pinions 170, 171 in the gear racks 172, 173 on guide tracks 160, 161 causes the carriage 140, and hence picker 130, to move through the first displacement path in media storage system 12. Depending on the direction of rotation of drive motor 166 (e.g., clockwise or counter-clockwise), the picker 130 is either raised or lowered in the media storage system 12. Once the picker 130 is positioned along the Z-axis, drive motor 166 may be shut off or otherwise disengaged.

Drive motor 152 may be operated to rotate drive pinion 154 operatively associated therewith. The cooperative action of the rotating drive pinion 154 and the rings 156 formed on transfer shaft 144 causes the picker 130 to move through the second displacement path in media storage system 12. Depending on the rotation of the drive motor 152 (e.g., clockwise or counter-clockwise), the picker 130 is moved in one direction or the other along the second displacement path. Once the picker 130 is positioned along the Y-axis, drive motor 152 may be shut off or otherwise disengaged.

Once the picker 130 has been positioned in the media storage system 12, the picker 130 may be operated to retract or eject the data cartridge 14. Cartridge-handling apparatus 10 may then be used to position the picker 130 elsewhere in the media storage system 12. Again, it should be understood that the operation of the cartridge-handling apparatus 10 is not limited to any particular order.

What is claimed is:

1. A cartridge-handling apparatus for a media storage system, comprising:
    a lift assembly having at least one guide track aligned along a first displacement path in the media storage system;
    a carriage having a transfer shaft aligned along a second displacement path in the media storage system, said transfer shaft operatively associated with said at least one guide track of said lift assembly for moving, said transfer shaft rotatable to drive said carriage along said at least one guide track through said first displacement path; and
    a picker slidably mounted on said carriage to said transfer shaft, said picker moving with said carriage through said first displacement path, said picker moving on said transfer shaft through said second displacement path.

2. The cartridge-handling apparatus of claim 1, wherein said transfer shaft extends between two guide tracks, each end of said transfer shaft engaging one of said two guide tracks.

3. The cartridge-handling apparatus of claim 1, wherein said lift assembly has at least one elongate bearing race extending substantially the length of said at least one guide track, said transfer shaft slidably mounted in said bearing race.

4. The cartridge-handling apparatus of claim 1, further comprising a drive motor mounted to said carriage, said drive motor operatively associated with said at least one guide track for moving said picker through said first displacement path.

5. The cartridge-handling apparatus of claim 1, further comprising a drive motor mounted to said picker, said drive motor operatively associated with said carriage for moving said picker through said second displacement path.

6. The cartridge-handling apparatus of claim 1, further comprising a drive motor mounted to said picker, said drive motor operatively associated with said transfer shaft on said carriage for moving said picker through said second displacement path.

7. The cartridge-handling apparatus of claim 6, wherein said transfer shaft has a plurality of zero-pitch rings formed about the circumference thereof, and said drive motor operates at least one drive pinion, said at least one drive pinion engaging said plurality of zero-pitch rings on said transfer shaft.

8. The cartridge-handling apparatus of claim 1, wherein said carriage has a transfer platform mounted in spaced-apart relation to said transfer shaft, said transfer platform supporting said picker on said carriage.

9. The cartridge-handling apparatus of claim 1, further comprising a guide wheel mounted to said carriage, said guide wheel engaging said at least one guide track.

10. The cartridge-handling apparatus of claim 1, further comprising a guide bearing pivotally mounted to said picker, said guide bearing engaging said carriage.

11. The cartridge-handling apparatus of claim 1, wherein said first displacement path is substantially orthogonal to said second displacement path.

12. A cartridge-handling apparatus for a media storage system, comprising:
    a lift assembly having at least one guide track aligned along a first displacement path in the media storage system;
    a carriage having a transfer shaft aligned along a second displacement path in the media storage system, said transfer shaft rotatably engaging said at least one guide track;
    a picker mounted to said carriage on said transfer shaft;
    a first drive motor mounted to said carriage, said first drive motor operatively associated with said transfer shaft for moving said picker along said at least one guide track through said first displacement path; and
    a second drive motor mounted to said picker, said second drive motor operatively associated with said carriage for moving said picker along said transfer shaft through said second displacement path.

13. The cartridge-handling apparatus of claim 12, wherein said lift assembly has at least one gear rack operatively associated with said first drive motor.

14. The cartridge-handling apparatus of claim 12, wherein said first drive motor operates at least one drive pinion, said at least one drive pinion engaging said at least one gear rack on said lift assembly.

15. The cartridge-handling apparatus of claim 12, further comprising a plurality of zero-pitch rings formed on said transfer shaft.

16. The cartridge-handling apparatus of claim 15, wherein said second drive motor operates at least one drive pinion, said at least one drive pinion engaging said plurality of zero-pitch rings formed on said transfer shaft.

17. The cartridge-handling apparatus of claim 12, wherein said carriage has a gear rack operatively associated with said second drive motor.

18. The cartridge-handling apparatus of claim 17, wherein said second drive motor operates at least one drive pinion, said at least one drive pinion engaging said gear rack on said carriage.

19. The cartridge-handling apparatus of claim 12, wherein said lift assembly has at least one elongate bearing race aligned along the first displacement path, and wherein said carriage has at least one bearing member, said at least one bearing member on said carriage slidably engaging said at least one elongate bearing race on said lift assembly.

20. The cartridge-handling apparatus of claim 12, further comprising at least one guide wheel mounted to said carriage, said at least one guide wheel engaging said at least one guide track.

21. The cartridge-handling apparatus of claim 12, further comprising an umbilical cable flexibly connected to said picker.

22. The cartridge-handling apparatus of claim 21, wherein said carriage has an umbilical tray, said umbilical tray collecting said umbilical cable.

23. The cartridge-handling apparatus of claim 12, wherein said carriage comprises a transfer platform mounted in spaced-apart relation to said transfer shaft.

24. The cartridge-handling apparatus of claim 23, further comprising a guide bearing mounted to said picker, said guide bearing engaging said transfer platform.

25. A cartridge-handling apparatus for a media storage system, comprising:
    first guide means for defining a first displacement path in the media storage system;
    second guide means for defining a second displacement path in the media storage system, said second guide means rotatably engaging rotating directly on said first guide means for moving said second guide means along said first guide means through the first displacement path; and cartridge-engaging means for transporting a data cartridge through the first and second displacement paths, said cartridge-engaging means moving with said second guide means through the first displacement path, said cartridge-engaging means moving on said second guide means through the second displacement path.

26. The cartridge-handling apparatus of claim 25, further comprising drive means for moving said second guide means through the first displacement path.

27. The cartridge-handling apparatus of claim 25, further comprising drive means for moving said cartridge-engaging means through the second displacement path.

28. A cartridge-handling apparatus for a media storage system, comprising:
- a lift assembly having at least one guide track aligned along a first displacement path in the media storage system;
- a carriage having a transfer shaft aligned along a second displacement path in the media storage system, said transfer shaft operatively associated with said at least one guide track of said lift assembly and being rotatable for moving said carriage along said at least one guide track through said first displacement path;
- a picker slidably mounted on said carriage to said transfer shaft, said picker moving with said carriage through said first displacement path, said picker moving on said transfer shaft through said second displacement path in such a manner that said transfer shaft rotates without causing said picker to rotate; and
- a drive motor mounted to said picker, said drive motor operatively associated with said transfer shaft on said carriage for moving said picker through said second displacement path.

29. The cartridge-handling apparatus of claim 28, wherein said transfer shaft has a plurality of zero-pitch rings formed about the circumference thereof, and said drive motor operates at least one drive pinion, said at least one drive pinion engaging said plurality of zero-pitch rings on said transfer shaft.

* * * * *

UNITED STATES PATENT AND TRADEMARK OFFICE
CERTIFICATE OF CORRECTION

PATENT NO. : 7,334,978 B2  Page 1 of 1
APPLICATION NO. : 10/601437
DATED : February 26, 2008
INVENTOR(S) : Paul C. Coffin et al.

It is certified that error appears in the above-identified patent and that said Letters Patent is hereby corrected as shown below:

In column 9, line 11, in Claim 1, after "assembly" delete "for moving".

In column 10, line 17, in Claim 14, delete "12" and insert -- 13 --, therefor.

In column 10, line 64, in Claim 25, after "means" delete "rotatably engaging".

Signed and Sealed this

Fifth Day of August, 2008

JON W. DUDAS
*Director of the United States Patent and Trademark Office*